US009135713B2

(12) United States Patent
Hermann et al.

(10) Patent No.: US 9,135,713 B2
(45) Date of Patent: Sep. 15, 2015

(54) CRANIAL SUTURE SNAKE ALGORITHM

(75) Inventors: Christopher Douglas Hermann, Atlanta, GA (US); Barbara Dale Boyan, Atlanta, GA (US); Zvi Schwartz, Atlanta, GA (US)

(73) Assignee: GEORGIA TECH RESEARCH CORPORATION, Atlanta, GA (US)

(*) Notice: Subject to any disclaimer, the term of this patent is extended or adjusted under 35 U.S.C. 154(b) by 254 days.

(21) Appl. No.: 13/635,105

(22) PCT Filed: Mar. 15, 2011

(86) PCT No.: PCT/US2011/028539
§ 371 (c)(1),
(2), (4) Date: Mar. 26, 2013

(87) PCT Pub. No.: WO2011/116004
PCT Pub. Date: Sep. 22, 2011

(65) Prior Publication Data
US 2013/0195324 A1 Aug. 1, 2013

Related U.S. Application Data

(60) Provisional application No. 61/313,938, filed on Mar. 15, 2010.

(51) Int. Cl.
G06K 9/00 (2006.01)
G06T 7/00 (2006.01)

(52) U.S. Cl.
CPC ............ *G06T 7/0083* (2013.01); *G06T 7/0089* (2013.01); *G06T 2207/10081* (2013.01); *G06T 2207/20116* (2013.01); *G06T 2207/20148* (2013.01); *G06T 2207/30008* (2013.01)

(58) Field of Classification Search
None
See application file for complete search history.

(56) References Cited

U.S. PATENT DOCUMENTS

| 6,310,477 | B1* | 10/2001 | Schneider | 324/307 |
| 6,799,066 | B2 | 9/2004 | Steines et al. | |
| 7,022,073 | B2 | 4/2006 | Fan et al. | |
| 7,391,906 | B2 | 6/2008 | Blake et al. | |
| 7,593,762 | B2 | 9/2009 | Yu | |

(Continued)

OTHER PUBLICATIONS

International Search Report and Written Opinion dated Dec. 4, 2012 for related PCT Patent Application No. PCT/US2011/028539.

*Primary Examiner* — Chan Park
*Assistant Examiner* — Mai Tran
(74) *Attorney, Agent, or Firm* — Troutman Sanders LLP; Ryan A. Schneider; Benjamin C. Wiles

(57) ABSTRACT

The invention is directed toward methods for assisting in interpreting medical images, especially useful for segmenting images produced by computed tomography or micro-computed tomography. In one embodiment, the invention is directed to method comprising initially identifying the images of the bones from a medical image, estimating a preliminary boundary of the bones, and subsequently segmenting the bones using a snake algorithm initialized by the preliminary boundary of the bones. The results can then be used to establish morphometric measurements from the medical images based on the segmented bone boundaries. In one embodiment of the present invention, the snake algorithm used is a continuous parametric Fourier series representation to fit and optimize the preliminary boundary of the bones to a more accurate representation of the segmented bone boundary from the data included in the image.

19 Claims, 11 Drawing Sheets

(56) References Cited

U.S. PATENT DOCUMENTS

| | | |
|---|---|---|
| 2003/0215119 A1 | 11/2003 | Uppaluri et al. |
| 2004/0101184 A1 | 5/2004 | Sivaramakrishna et al. |
| 2006/0228009 A1 | 10/2006 | Fidrich et al. |
| 2007/0081713 A1 | 4/2007 | Jerebko |
| 2007/0230814 A1* | 10/2007 | Haseyama et al. ............ 382/254 |
| 2007/0253611 A1 | 11/2007 | Rousson et al. |
| 2007/0274584 A1* | 11/2007 | Leow et al. .................... 382/132 |
| 2008/0043023 A1* | 2/2008 | Loop et al. ..................... 345/441 |
| 2008/0193006 A1 | 8/2008 | Udupa et al. |
| 2008/0240526 A1 | 10/2008 | Suri et al. |
| 2008/0260226 A1* | 10/2008 | Moriya ........................... 382/128 |
| 2008/0267481 A1* | 10/2008 | Nakamura .................... 382/131 |
| 2009/0290776 A1 | 11/2009 | Sun et al. |

\* cited by examiner

300

302

304

CRANIAL SUTURE SNAKE ALGORITHM

CROSS REFERENCE TO RELATED APPLICATION

This application claims benefit under 35 U.S.C. §119(e) of U.S. Provisional Patent Application No. 61/313,938 filed Mar. 15, 2010, and entitled "Cranial Suture Snake Algorithm", which is incorporated by reference as if set forth herein in its entirety.

TECHNICAL FIELD

The present system relates generally to medical image processing.

BACKGROUND

Medical images are typically grey scale images wherein pixels are assigned a grey value between white and black. Various tissue components such as bone, cartilage, fat or organs in the image can be distinguishable by their "grey value" or relative intensity. For various medical procedures, accurate identification of the boundaries between the various tissue components (segmentation) of a medical image is required. Conventional methods for identification of the boundaries of tissue components involve use of manual identification of a number of points near a tissue boundary, at least one imaged tissue component of the medical image or a specific tissue region of interest in the image. Manual identification of the boundaries involves a person, e.g. a doctor or a medical technician, examining each image and manually inputting what they think are the boundaries of the bones in the image. The boundaries identified are input into a computer system which then analyzes the remaining portions of the image. The input typically consists of the technician or doctor assigning a grey value or threshold level of intensity to signify bone versus non-bone portions of the image.

It is often difficult or time consuming to segment bones in medical images, especially if there are multiple images. In addition to the differing thresholds applied by various technicians or doctors, as bones age, they undergo a process of mineralization that increases the density of the bone. Thus, younger bones have a different image appearance than the older bones of an adult animal or human patient. Conventionally, the images including bone segments are segmented by use of a threshold grey scale value, commonly referred to as a global threshold. The threshold grey scale value can be used to segment bone because typically bone will be displayed on a medical image with the greatest grey scale values. Pixels with a grey scale value above the threshold can thus be considered to be bone and pixels with a grey scale value below the threshold can be considered to something other than bone, such as cartilage or a space between the bones. Problems with segmentation of bone occur due to variability and the age of bones. The same grey scale value can not be suitable for every image. To overcome these problems, grey scale threshold values can be subjectively chosen by the user for input and interpretation of the image based at least upon the experience of the user. Being subjective, though, introduces variability not only between the images analyzed by a technician or doctor but also between images analyzed amongst more than one doctor or technician. This variability of the threshold creates errors in the determination of the boundaries.

BRIEF SUMMARY OF THE DISCLOSURE

Briefly described, the present invention is directed towards methods incorporated into one or more software applications or implemented by a computer for assisting in interpreting medical images, including segmenting images produced by various imaging modality including, but not limited to, computed tomography or micro-computed tomography. In an exemplary embodiment, the present invention comprises initially identifying the images of one or more bones from the digital medical image, estimating a preliminary boundary of the one or more bones by using a global threshold value on the digital medical image, storing the preliminary boundary on a computer readable storage medium, and initializing a snake algorithm comprising an energy. In one embodiment, the snake algorithm is initialized by the preliminary boundary of the bones to optimize a final segmentation boundary of the digital medical image.

The foregoing summarizes some beneficial aspects of the present invention, but is not intended to be reflective of the full scope of the present invention as claimed. Additional features and advantages of the present invention are set forth in the following description, are apparent from the description, or learned by practicing the present invention. Moreover, the foregoing summary and following detailed description are exemplary and explanatory, and are intended to provide further explanation of the present invention as claimed.

BRIEF DESCRIPTION OF THE DRAWINGS

The accompanying drawings, which are incorporated in and constitute a part of this specification, illustrate multiple exemplary embodiments of the present invention and, together with the description, serve to explain the principles of the present invention. They are not intended in any manner to limit the scope of the present invention. Headings provided herein are for convenience only and do not necessarily affect the scope or meaning of the claimed invention.

DETAILED DESCRIPTION

Figure 1:
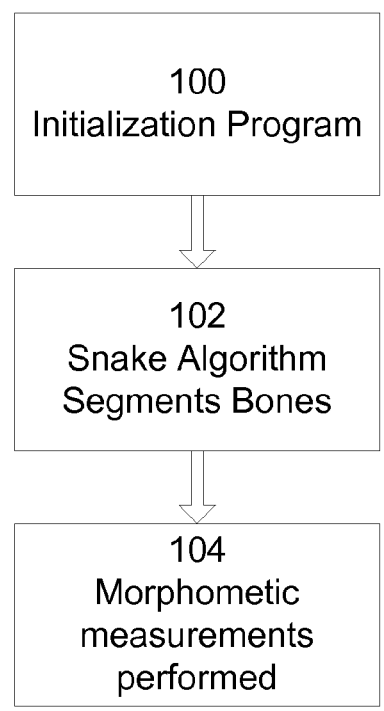
FIG. 1 is a flow diagram of an exemplary method for processing medical images in accordance with an embodiment of the present invention.

The subject matter of the various embodiments of the present invention is described with specificity to meet statutory requirements. However, the description itself is not intended to limit the scope of the claimed invention. Rather, it has been contemplated that the claimed invention can be embodied in other ways, to include different steps or elements similar to the ones described in this document, in conjunction with other present or future technologies. Although the term "step" can be used herein to connote different aspects of methods employed, the term should not be interpreted as implying any particular order among or between various steps herein disclosed unless and except when the order of individual steps is explicitly required. It is also to be understood that the mention of one or more method steps does not preclude the presence of additional method steps or intervening method steps between those steps expressly identified.

It should be noted that, as used in the specification and the claims, the singular forms "a," "an" and "the" include plural references unless the context clearly dictates otherwise. Ranges can be expressed herein as from "about" or "approximately" one particular value and/or to "about" or "approximately" another particular value. When such a range is expressed, other exemplary embodiments include from the one particular value and/or to the other particular value. The terms "comprising" or "containing" or "including" mean that at least the named component, element, apparatus, or method step is present in the system or article or method, but does not exclude the presence of other components, materials, apparatus, or method steps, even if the other such components, material, particles, and method steps have the same function as what is named.

As previously mentioned, a common challenge in medical image processing is to accurately segment medical images into different tissue types. For orthopedic and craniofacial applications this typically involves determining which regions of the images correspond to bone and those that correspond to other tissues. A conventional imaging modality for studying bone is computed tomography (CT) or for smaller samples micro-computed tomography (uCT). Both modalities use x-rays to create 3D images of the sample or patient and the gray-scale images correlate to the density of the sample. Conventionally, the segmentation of the bones in the one or more images is done with a global intensity threshold. With this method any pixel with a value above the threshold is determined to be bone and those whose value is below the threshold is determined to be not bone. As discussed above, the threshold is typically set by a person viewing the images and making a determination that the value adequately separates bone from non-bone components in the images.

The manual setting of the threshold can introduce errors into the imaging process such as the determination that a component in an image is non-bone because the intensity of the component does not meet the threshold value. Errors such as this can occur in areas of the body where the bone density is not constant. For example, in the development of the skull and other long bones, the bones undergo a process of mineralization that results in changes in density of the tissues over time. In this example, one bone can be of different density than another bone in the same image, or, the single bone itself can vary in density across its length. This phenomenon makes it challenging to segment the images because there is a great deal of variation among the images and also within the image itself. As a result, the bone in a very young test subject skull has a very different image appearance and composition than an adult skull. In the segmentation of the test subject skulls of varying ages, a different threshold must be subjectively chosen for each of the time points. Not only does this introduce the opportunity for bias by the evaluator, but also small changes in the threshold can result in large changes in the end segmentation.

To help reduce the errors found in conventional medical imaging, the present invention uses a snake algorithm to approximate then optimize the segmentation boundary. Snakes, or active contours, are curves defined within an image domain that can move under the influence of external forces coming from within the curve itself and external forces computed from the image data. The snake algorithm of the present invention comprises an adaptive contour segmentation algorithm that is used to detect object boundaries in an image. In one embodiment of the present invention, the snake algorithm optimizes the segmentation boundary by reducing an energy term that is calculated based on the geometry and the relative edge intensity of the boundary.

The present invention can be used for various diagnostic procedures involving, but not limited to, reconstructing and quantifying normal cranial and suture development, reconstructing and quantifying pathologic suture fusion, reconstructing and quantifying fractures of the skull, reconstructing and quantifying skull re-growth (re-synostosis) following surgical intervention, reconstructing and quantifying fracture healing, normal long bone fractures, fractures involving the acetabulum and pelvis, non-union and delayed union fractures, predicting non-union fractures, reconstructing and quantifying growth plated in long bones, skull, and other regions, reconstructing and quantifying fractures involving the growth plates, reconstructing and quantifying patients with poor bone mineralization, osteoporosis/osteopenia, metabolic bone diseases, reconstructing and quantifying the spine, spine fractures, scoliosis or other developmental spine disorders, spine tumors, disk degeneration, reconstructing and quantifying articular or meniscal cartilage, reconstructing and quantifying other joint spaces or cartilage structures, quantifying breast tumors, reconstructing and quantifying bone tumors or osteolytic lesions, reconstructing and quantifying tumor metastasis to bone and other tissues, reconstructing and quantifying blood vessel geometries and volumes, reconstructing and quantifying the mandible and maxilla, normal and pathologic development, TMJ disease, fractures, healing of dental implants and healing following other bone surgeries.

FIG. 1 is a flow diagram of an exemplary method for processing medical images according to an embodiment of the present invention. The process of FIG. 1 was designed to overcome limitations found in conventional medical imaging processes by providing an automated or semi-automated method for segmenting bones, such as cranial bones, having a wide range of densities. The process is comprised of three main phases. An initialization step separates 100 the bone(s) and provides an estimate of the boundaries. A global threshold can be used to determine the number of bones present and, if there is only one bone, can identify a preliminary boundary.

The use of this initialization plays a role in the automation of the present invention. Conventional snake algorithms use manual clicking (or other form of input) to provide an initial best guess of the boundaries. The use of a global threshold not only speeds up the analysis by removing the need for user input, but it also improves the results of the Snake algorithm. This occurs because the global threshold provides a more accurate first guess that both speeds up the algorithm and results in more accurate final results. In the event that the global threshold is not satisfactory, a way to manually change the global threshold of a given image can be provided.

As discussed previously, a snake algorithm is then used to segment 102 the bones. An exemplary embodiment of the present invention utilizes a continuous Fourier series representation of the segmented boundary. This allows the snake algorithm to bridge gaps in a bone having regions that are not completely mineralized which in conventional techniques can be shown as missing or segmented bone. The segmentation of certain bone structures, such as cranial sutures, can be further complicated by the presence of fibrous tissue that is contained within the suture. As a result, minor changes in the global threshold can lead to very substantial changes in the segmentation boundary of the sutures. The use of the snake algorithm of the present invention overcomes this challenge because the final segmentation boundary is not dependent on the pixel intensities; rather it is driven by the relative change between them.

The snake algorithm according to an embodiment of the present invention uses the approximate boundary from the initialization phase to optimize a final segmentation boundary. In one embodiment of the present invention, a Fourier descriptors model can be fit through these points with the following form:

$$x(t) = a_0 + \sum_{k=1}^{K} (a_k \cos kt + b_k \sin kt); \quad \text{Equation 1}$$

$$y(t) = c_0 + \sum_{k=1}^{K} (c_k \cos kt + d_k \sin kt), \quad \text{Equation 2}$$

where $a_0$ and $c_0$ are constants corresponding to the centroid of the curve, K is the number of harmonics, and $a_k$, $b_k$, $c_k$, and $d_k$ are coefficients that control the shape of the $k^{th}$ harmonic. The curve was optimized by varying the coefficients $a_0$, $c_0$, $a_k$, $b_k$, $c_k$, and $d_k$ to minimize the following snake energy functional:

$$E = \int_0^1 \alpha(S) \left| \frac{dV(s)}{dV} \right|^2 ds + \int_0^1 \beta(s) \left| \frac{d^2 V(s)}{ds^2} \right|^2 ds - \int_0^1 |\nabla I(s)| ds, \quad \text{Equation 3}$$

where E is the snake energy, V(s) is the Fourier descriptors equation, $\alpha(s)$ is the coefficient controlling the relative weight of the curvature term, $\beta(s)$ is the coefficient controlling the relative weight of the stretching term, and $|\nabla I(s)|$ is the magnitude of the gradient image evaluated at each of the points along the curve V(s). This term can be calculated by taking the magnitude of the horizontal and vertical central difference derivative over the entire image.

As the curve optimization proceeds to minimize the energy term, the curve will be fit to regions where the magnitude of the gradient is greatest. This allows the algorithm to fit a curve along a path where the edges are sharpest. By controlling the value of $\alpha(s)$ and $\beta(s)$ it is possible to control how tightly the optimized curve bends and how rapidly the curve changes in length, respectively.

Step 102 is repeated until certain conditions are met. For example, step 102 can be performed until the energy of the Snake algorithm does not change between iterations, providing an ideal solution. In some instances there can be multiple solutions of the snake algorithm that are very similar and the algorithm jumps back and forth between them. To address this issue the user can specify a certain or predetermined number of iterations that the program will not exceed.

This algorithm allows for segmentation that is independent of the pixel intensity of the segmented object. Additionally, the continuous boundary of the optimized curve allows for bridging of gaps in the images where the edges are poorly defined. A feature of the algorithm of an embodiment of the present invention is that the result from one optimization of the snake algorithm is used as the initialization points for the subsequent iterations of the algorithm. This process is repeated until the snake energy converges resulting in the optimal segmentation boundary. In some instances there can be two or more substantially equivalent segmentation boundaries that the algorithm would alternate indefinitely between during optimization. These indeterminate solutions can be prevented by the introduction of an iteration limit in the algorithm.

If there is more than one bone present, the image can be processed according to various embodiments described above or can also be separated into parts, e.g. two halves prior to the identification of the preliminary boundary. This process can be used because in cases where two bones are in close proximity the "snake" of the snake algorithm can incorrectly "jump" to an adjacent bone. In order to separate the images, the boundaries of the two bones are identified using the same global threshold as above in step 100. In one example of the present invention, a horizontal midpoint between each of the bones can be determined and a third order polynomial can fit between these points. It should be noted that the present invention is not limited to horizontal midpoints, as other midpoints can be used such as, but not limited to, vertical or radial midpoints. It should be further noted that the present invention is not limited to the use of a third order polynomial, as other fitting equations can be used such as, but not limited to, second order polynomial. The polynomial helps account for the gaps in the global threshold edges. The polynomial helps to reduce the effect of outlier points and can also then be used to determine the actual center line between the two points. The actual process of image separation uses these center points to produce two images, with only one bone in each image.

An advantage of the present invention is that the edges of bones (or other structures) can be automatically identified with varying densities in medical images. The same algorithm parameters can be used for all ages of samples and without having to subjectively set an intensity threshold. This is of particular interest for studying developmental changes because of the change in baseline tissue morphology. Another advantage of the algorithm is that the segmentation is based on a continuous function that prevents small gaps in the final segmentation. Traditional segmentation techniques commonly result in small gaps in the final images due to small fluctuations in the image intensity. More specifically, if there is a region in the tissue that is just below the threshold it will not be included in bone and the segmented image will have a hole/gap in the image. This program overcomes these limitations and "jumps" these gaps because the algorithm fits a closed, continuous curve to the image.

The present invention can be used for various applications with little or no modification. The present invention can be used in orthopedic applications such as analysis of the growth plate or looking at fracture healing in CT images or plain x-rays. In addition to studying early development, various embodiments of the present invention could also be used to study density changes associated with osteoporosis. In all of these cases the density of the bone changes dramatically throughout the image. The present invention can also be used for other medical imaging modalities such as, but not limited to, MRI, histology, and ultrasound. For example, the program could be used to identify ventricular walls on cardiac MRI or to analyze neonatal ultrasound images. In addition to examining cranial development, the present invention can be used in other applications. An advantage of the present invention is the ability to segment irregular and discontinuous objects. For example, various embodiments of the present invention can be used to analyze scans of children with craniosynostosis to quantify healing of the skull following surgery. Various embodiments of the present invention can be used to predict re-synostosis, or the re-fusion of the skull following surgical intervention for craniosynostosis. In addition to craniofacial imaging, there are many instances where the changing composition of mineralized tissues over time makes accurate segmentation difficult. These include, but are not limited to, osteopenic changes later in life, fracture repair and remodeling, bone neoplasia and metastases, and metabolic bone diseases.

Once the edges of the one or more bones in the images are segmented, a user or apparatus can take morphometric measurements 104 based on the segmented boundaries. These morphometric measurements can include, but are not limited to, the distance between various boundaries of the segments can be determined. In another example, the area of varying densities within a bone segment or between bone segments can be measured.

Figure 2:
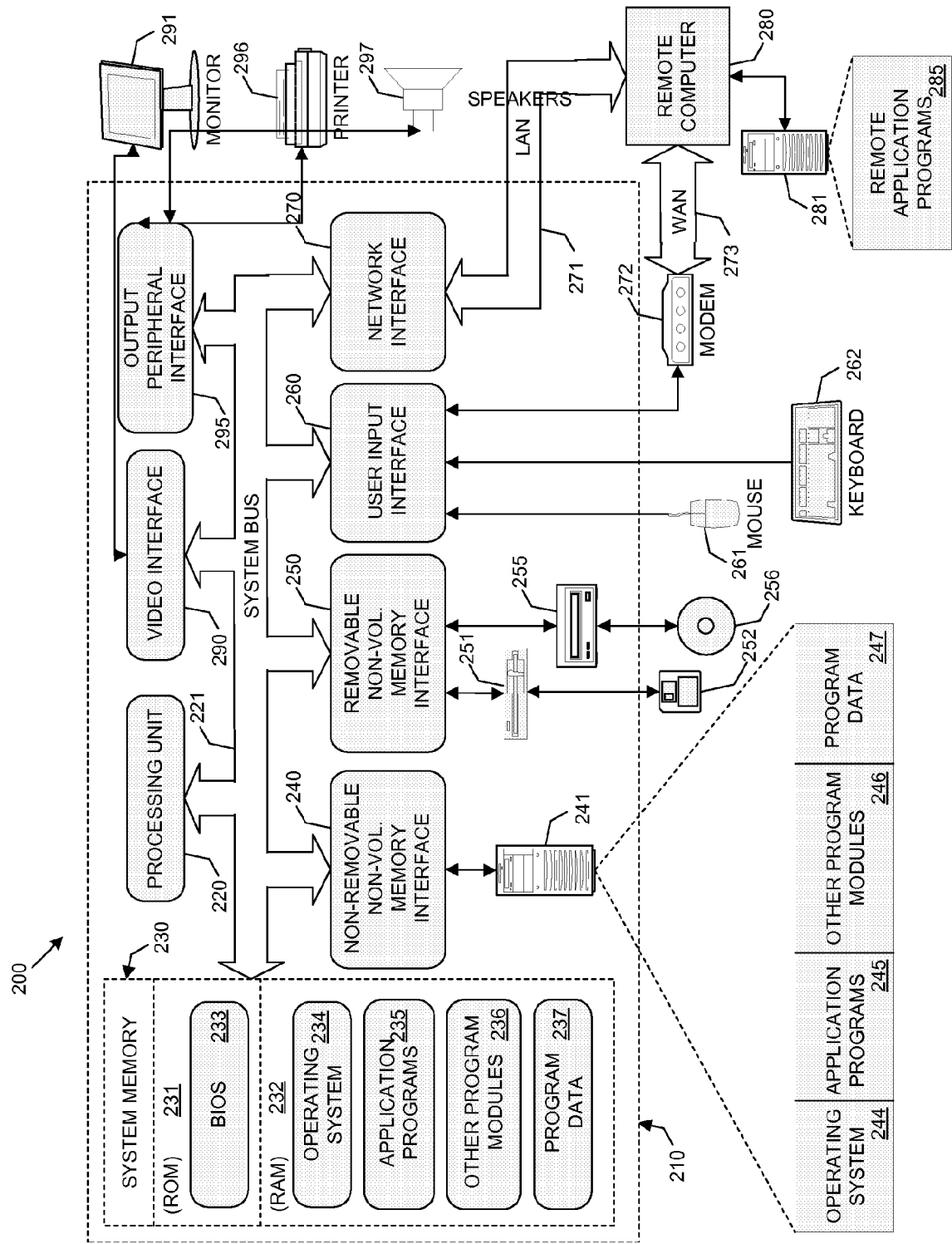
FIG. 2 is a system diagram for processing medical images in accordance with an embodiment of the present invention.

In various embodiments of the present invention, a computer can perform all or part of the process of FIG. 1 because the present invention provides for an automated or semi-automated processing. FIG. 2 and the following description provide a general description of a suitable computing environment in which various embodiments of the present invention can be implemented. Although specific components of a computing device 200 are illustrated in FIG. 2, the depiction of these components in lieu of others does not limit the scope of the invention. Rather, various types of computing devices can be used to implement various embodiments of the present invention. Examples of well known computing systems, environments, and/or configurations that can be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 2, components of the computing device 200 can comprise, without limitation, a processing unit 220 and a system memory 230. A system bus 221 can couple various system components including the system memory 230 to the processing unit 220. The system bus 221 can be any of several types of bus structures including a memory bus or memory controller, a peripheral bus, and a local bus using any of a variety of bus architectures. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 200 can include a variety of computer readable media. Computer-readable media can be any available media that can be accessed by the computing device 200, including volatile and nonvolatile, removable and non-removable media. For example, and not limitation, computer-readable media can comprise computer storage media and communication media. Computer storage media includes volatile and nonvolatile, removable and non-removable media implemented in any method or technology for storage of information such as computer readable instructions, data structures, program modules or other data. Computer storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the computing device 200.

Communication media can typically contain computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, and not limitation, communication media includes wired media such as a wired network or direct-wired connection, and wireless media such as acoustic, RF, infrared and other wireless media. Combinations of any of the above can also be included within the scope of computer readable media.

The system memory 230 can comprise computer storage media in the form of volatile and/or nonvolatile memory such as read only memory (ROM) 231 and random access memory (RAM) 232. A basic input/output system 233 (BIOS), containing the basic routines that help to transfer information between elements within the computing device 200, such as during start-up, can typically be stored in the ROM 231. The RAM 232 typically contains data and/or program modules that are immediately accessible to and/or presently in operation by the processing unit 220. For example, and not limitation, FIG. 2 illustrates operating system 234, application programs 235, other program modules 236, and program data 237.

The computing device 200 can also include other removable/non-removable, volatile/nonvolatile computer storage media. By way of example only, FIG. 2 illustrates a hard disk drive 241 that can read from or write to non-removable, nonvolatile magnetic media, a magnetic disk drive 251 for reading or writing to a nonvolatile magnetic disk 252, and an optical disk drive 255 for reading or writing to a nonvolatile optical disk 256, such as a CD ROM or other optical media. Other removable/non-removable, volatile/nonvolatile computer storage media that can be used in the exemplary operating environment can include magnetic tape cassettes, flash memory cards, digital versatile disks, digital video tape, solid state RAM, solid state ROM, and the like. The hard disk drive 241 can be connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2 can provide storage of computer readable instructions, data structures, program modules and other data for the computing device 200. For example, hard disk drive 241 is illustrated as storing an operating system 244, application programs 245, other program modules 246, and program data 247. These components can either be the same as or different from operating system 234, application programs 235, other program modules 236, and program data 237.

A web browser application program 235, or web client, can be stored on the hard disk drive 241 or other storage media. The web client can comprise an application program 235 for requesting and rendering web pages, such as those created in Hypertext Markup Language ("HTML") or other markup languages. The web client can be capable of executing client side objects, as well as scripts through the use of a scripting host. The scripting host executes program code expressed as scripts within the browser environment. Additionally, the web client can execute web application programs 235, which can be embodied in web pages.

A user of the computing device 200 can enter commands and information into the computing device 200 through input devices such as a keyboard 262 and pointing device 261, commonly referred to as a mouse, trackball, or touch pad. Other input devices (not shown) can include a microphone, joystick, game pad, satellite dish, scanner, electronic white board, or the like. These and other input devices are often connected to the processing unit 220 through a user input interface 260 coupled to the system bus 221, but can be connected by other interface and bus structures, such as a parallel port, game port, or a universal serial bus (USB). A monitor 291 or other type of display device can also be connected to the system bus 221 via an interface, such as a video interface 290. In addition to the monitor, the computing device 200 can also include other peripheral output devices such as speakers 297 and a printer 296. These can be connected through an output peripheral interface 295.

The computing device 200 can operate in a networked environment using logical connections to one or more remote computers, such as a remote computer 280. The remote computer 280 can be a personal computer, a server, a router, a network PC, a peer device, or other common network node, and can include many or all of the elements described above relative to the computing device 200, including a memory storage device 281. The logical connections depicted in FIG. 2 include a local area network (LAN) 271 and a wide area network (WAN) 273, but can also include other networks.

When used in a LAN networking environment, the computing device 200 can be connected to the LAN 271 through a network interface or adapter 270. When used in a WAN networking environment, the computing device 200 can include a modem 272 or other means for establishing communications over the WAN 273, such as the internet. The modem 272, which can be internal or external, can be connected to the system bus 221 via the user input interface 260 or other appropriate mechanism. In a networked environment, program modules depicted relative to the computing device 200 can be stored in the remote memory storage device. For example, and not limitation, FIG. 2 illustrates remote application programs 285 as residing on memory device 281. It will be appreciated that the network connections shown are exemplary and other means of establishing a communications link between the computers can be used.

FIGS. 3-7 are illustrations showing the application of various embodiments of the present invention in a three dimensional ("3D") image analysis. When reconstructing the images of bones in three dimensions, limitations in the imaging apparatus should be taken into account to avoid or limit the possibility of errors introduced from the "flattening" of the 3D bone segment or segments being analyzed into a 2D image, similar to the errors introduced when a spherical map of the Earth is superimposed on a flat map. Errors can also be caused by irregular curvatures of the tissue or bone, such as in the case of craniosynostosis. In a similar manner, the cranium of a typical test subject can have substantial curvature in multiple regions of the cranium. If 3D images are reconstructed to be perpendicular about only one or two axes, i.e. 2D, various bone segments can be hidden by other features or can be erroneously flattened to appear that there is not segmentation. The ways in which the bones of the skull form and heal are important in medical analysis, thus requiring a certain degree of accuracy in order to provide an adequate medical opinion. The coronal suture, the dense, fibrous connective tissue joint that separates the frontal and parietal bones of the skull, curves substantially about all three axes from medial to lateral. In looking at straight coronal sections, the suture appears to be stretched towards the lateral aspects. This is of particular concern when examining distance measurements because the coronal suture is being cut at an oblique angle, which can artificially increase the distances between the two bones. Other uses of various embodiments of the present invention include, but are not limited to, the reconstruction of other curved structures such as, but not limited to, the lambdoid suture, pelvis, spine or acetabulum.

As will be shown by way of the experiment below, various embodiments of the present invention help to reconstruct images so that they are perpendicular to the suture about all three axes. This helps to reduce errors caused when a 3D image is superimposed onto a 2D template.

3D Imaging Experiment Overview

One random sample from 6, 12, 20, and 25 day old mice were decalcified in Calex® (Fisher Scientific, Pittsburgh, Pa.) for 6 days, changing the solution every 48 hrs. Complete decalcification was verified by plain x-ray (Faxitron X-ray, Lincolnshire, Ill.) before and after decalcification. The samples were trimmed, dehydrated in serial washes of ethanol, and embedded in paraffin. For analysis of the posterior frontal suture, serial sectioning of the entire posterior frontal suture was made with 7 µm thick sections every 50 µm (Microm HM 325, Microm International, Waldorf, Germany). The sections were stained with haematoxylin and eosin and then imaged at 10× magnification with a Leica DMLB microscope (Leica Microsystems, Bannockburn, Ill.). To provide direct comparisons of the distance measurements between the micro-CT and the histology, the boundaries of the bone(s) were outlined manually for all of the sections.

For analysis of the histology validation, the Pearson correlation coefficient was first compared for the number of measurements needed to be statistically significant, with a p value of less than 0.05 being considered significant. A least squares fit linear regression was performed for all measures and an $R^2$ value was calculated. The normality of the coronal suture data was determined using a Komogorov-Smirnov normality test. This was followed with a one way ANOVA using a Bartlett's test for equal variances. Statistical significance was determined using a Dunnett's Multiple Comparison post-hoc test, with a p value less than 0.05 considered significant. All analysis was performed using Graphpad Prism 5 software (GraphPad Software, La Jolla, Calif.).

Figure 3:
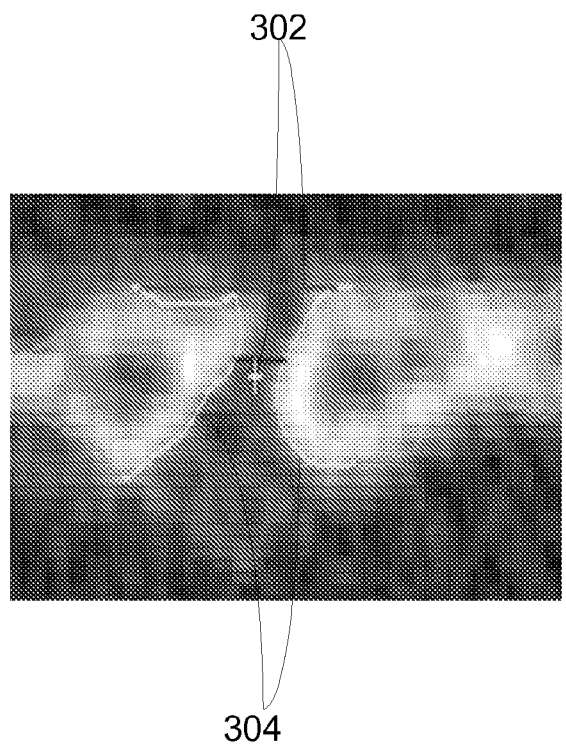
FIG. 3 is a medical image showing skull having a suture boundary that can be used in accordance with an embodiment of the present invention.
Figure 4:
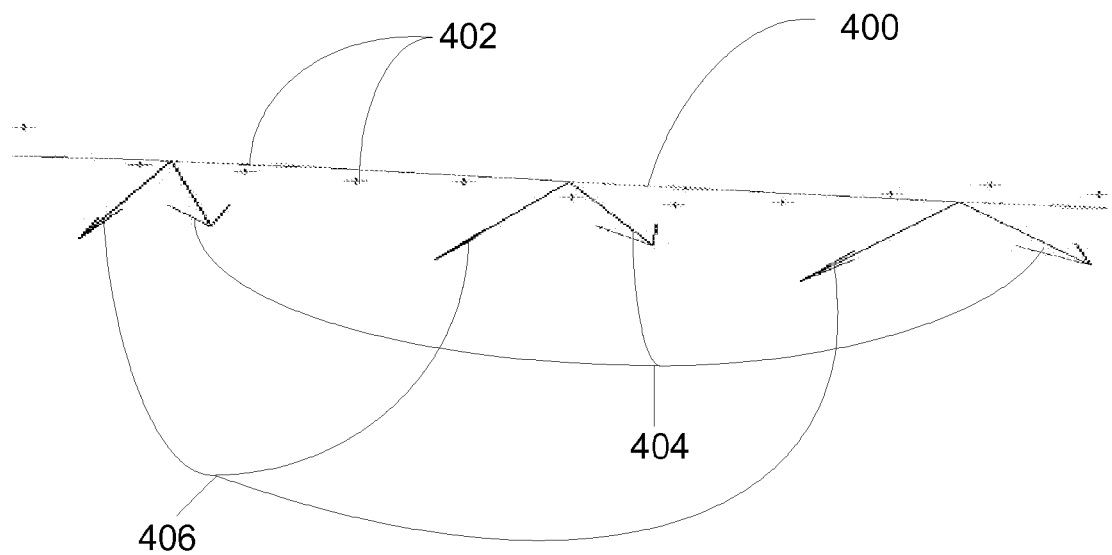
FIG. 4 is a graphical representation of a polynomial fit of data to determine a vector tangential to the suture boundary of the image if FIG. 3 in accordance with an embodiment of the present invention.

FIG. 3 is an image of a coronal suture 300 using the imaging process described above. The suture morphometric phase of the algorithm used the segmented boundaries of the bone(s) and made measurements 302 that corresponded to the suture boundaries 304. To reduce the introduction of artifacts (or errors) when analyzing the coronal suture, it can be preferable to reconstruct the image so that the image is perpendicular to a segmentation boundary, such as the suture, about all three axes. This can be especially important for the more lateral regions of the coronal suture where straight coronal sections are at the most oblique angle relative to the suture.

According to various embodiments of the present invention, a first step was to identify the center of the coronal suture once for every 20 unreconstructed coronal images. The center points of the coronal suture will be identified by the user in sagittal sections of the micro-CT scans. A third order polynomial was fit through these points and a derivative was taken to find a vector tangential to the suture. The partial derivative of this curve is calculated in all three dimensions using the central difference method. These derivatives are then used to create a unit vector that is tangent to the surface of the skull. FIG. 3 is a schematic showing three vectors from the reconstruction. Tangent vector 400 is found by a fit through user defined points, shown as "+" and by way of example as points 402.

Figure 5:
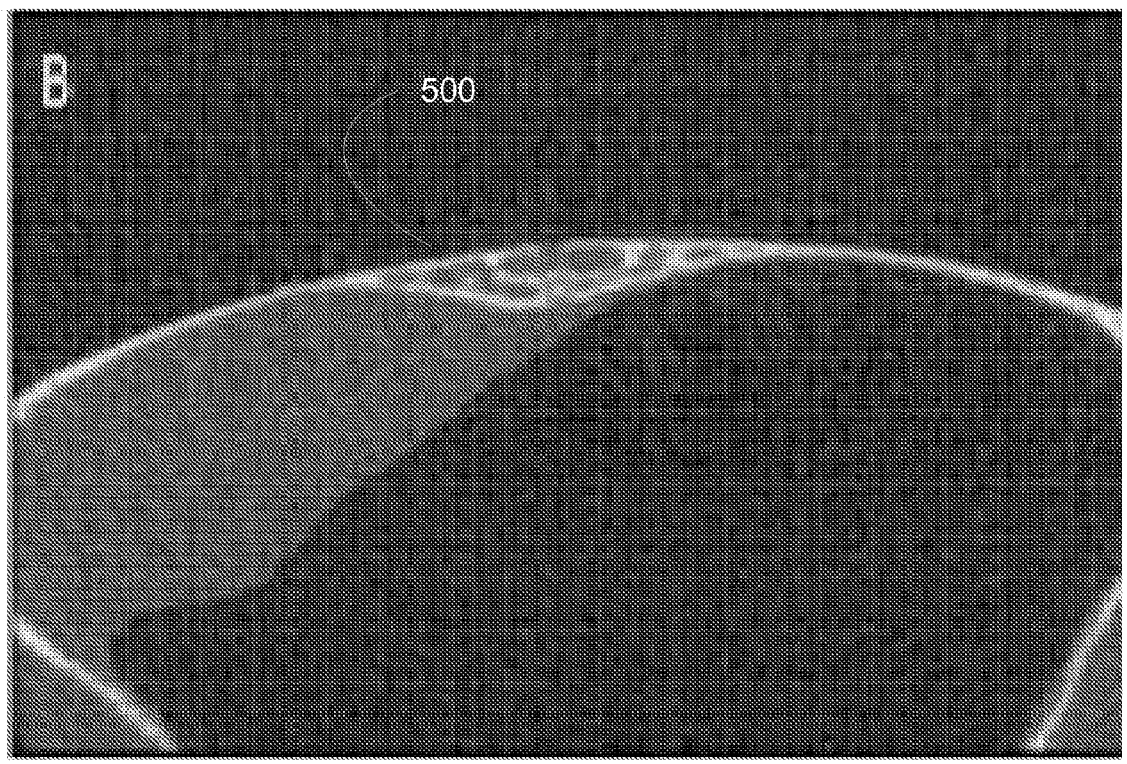
FIG. 5 is an image showing the determination of the ectocranial most points of the skull of FIG. 3 in accordance with an embodiment of the present invention.
Figure 6:
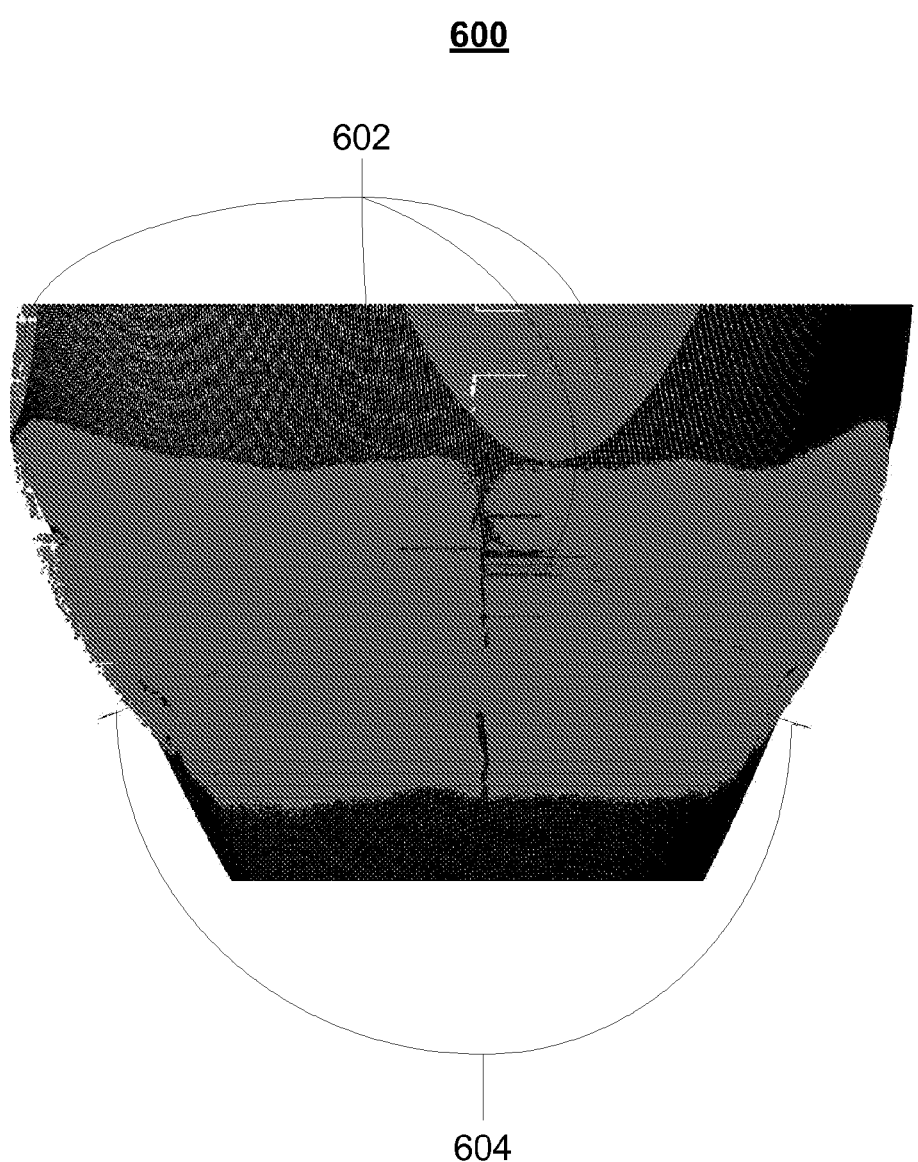
FIG. 6 is an illustration showing the determination of a vector normal to the surface of the skull of FIG. 3 in accordance with an embodiment of the present invention.

A global threshold is then applied the ectocranial most points of the ectocranial boundary 500 of the skull were determined, as shown in FIG. 5. The ectocranial boundary 500 of the skull was chosen because it does not have the irregularities associated with the ridges of the endocranial surface. A bi-cubic polynomial was then fit through the ectocranial most points of the ectocranial boundary 500 and used to find a vector normal to the surface of the skull at specified locations. The result is shown by way of illustration in FIG. 6. FIG. 6 illustrates at 3D reconstruction of the surface of a skull 600. The top surface 602 of the skull 600 was found using the global threshold and snake algorithm according to various embodiments of the present invention. Two vectors normal to the surface of the skull are shown as vectors 604. The cross product between the vectors 604 and the tangential vectors 400 of FIG. 4 were taken, resulting in a vector that is orthogonal to vectors 400 and 604.

Figure 7:
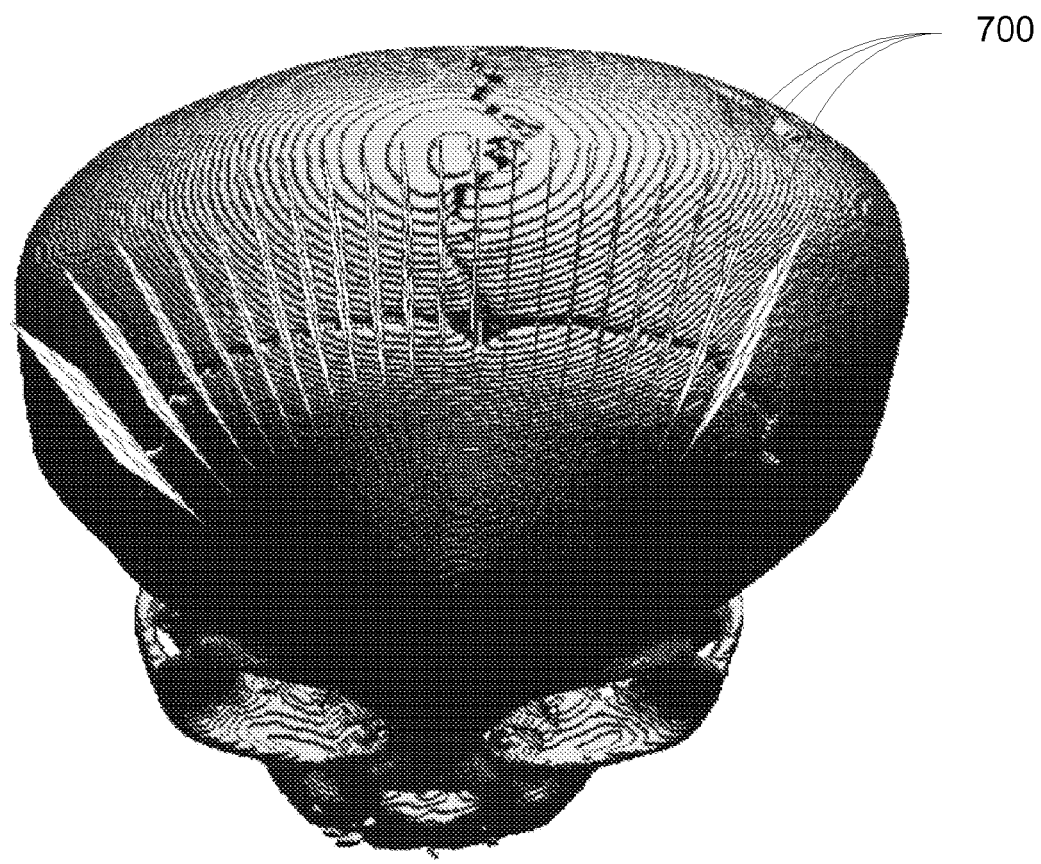
FIG. 7 is an illustration showing the vector and planar spatial calculations to reconstruct a three dimensional image in accordance with an embodiment of the present invention.
Figure 8A:
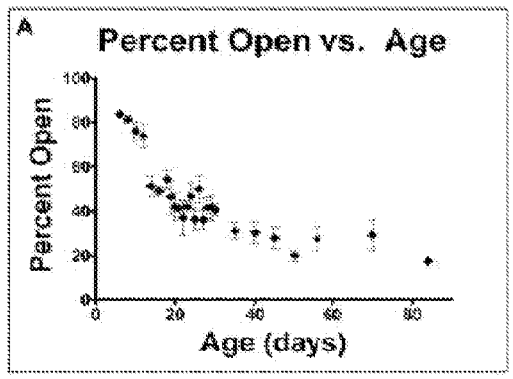
FIGS. 8a-8e are graphs showing the measurement of the posterior frontal suture boundary of FIG. 3 over time in accordance with an embodiment of the present invention.
Figure 8D:
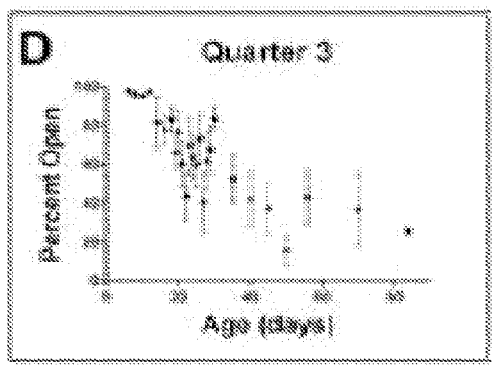
Figure 8B:
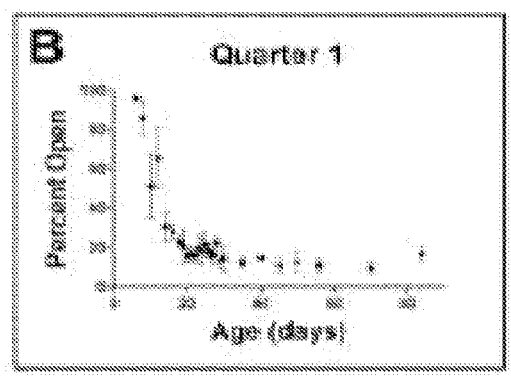
Figure 8E:
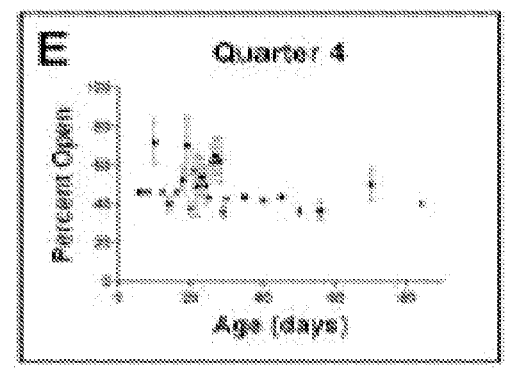
Figure 8C:
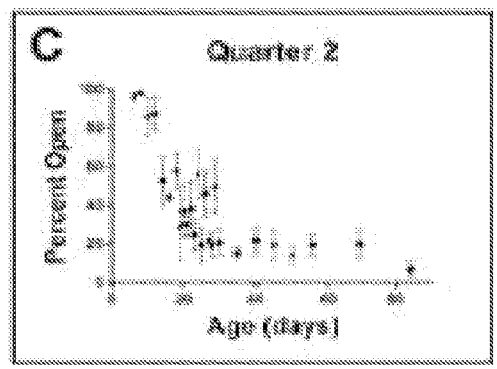

This surface is then used to calculate the unit vector normal to the top of the skull. The cross product between the normal and tangent vector is taken to find an orthogonal vector and is parallel to the suture in the YZ plane. This third vector and the normal vector are then used to perform bicubic interpolation in all three dimensions to reconstruct a new image that is perpendicular to the suture about all three axes. It should be noted that the present invention is not limited to bicubic interpolation, as other interpolation techniques can be used and are considered to be within the scope of the present invention. New vectors are calculated and the image interpolation is performed at 200 uniformly spaced intervals along the length of the suture. The reconstructed images were then processed with the snake algorithm described above. FIG. 7 illustrates a reconstructed image using bicubic interpolation. The planes of FIG. 7, shown by way of examples as planes 700, are defined by the normal and cross product vectors, as described by way of example in FIG. 3. The planes of FIG. 7 are of variable size wherein the nodes of the planes are used as interpolation locations for the image. As shown in FIG. 7, moving laterally, the planes rotate inwards and down, providing a means in which the 3D image can be reconstructed for medical image analysis.

Image Analysis Results

The initialization phase of the algorithm correctly approximated the bone boundaries and separated the images 90-99% of the time along the posterior frontal suture, being more accurate for the older samples. The interactive tool was able to correct all of the initialization errors by manually separating the images and modifying the global threshold.

FIGS. 8a-e are graphical illustrations showing measurements using various embodiments of the present invention. The percentage of images that were open along the posterior frontal suture showed that at 6 days the entire posterior frontal suture was 84% open and decreased until reaching a plateau at approximately day 20, illustrated in FIG. 8a. The suture never completely fused and was approximately 20% open even on day 84. The analysis of the spatial variation showed that the anterior most $1^{st}$ quarter was nearly 100% open at day 6, was 10% open by day 20, and remained approximately 10% open through the remainder of time points examined, shown in FIG. 8b. The $2^{nd}$ and $3^{rd}$ quarters also began nearly 100% open, but the decrease was later and more gradual in the more posterior regions, shown in FIGS. 8c and 8d. The posterior most $4^{th}$ quarter, showed no substantial changes over the age range of the animals and was approximately 45% open throughout all ages, shown in FIG. 8e.

Figure 9A:
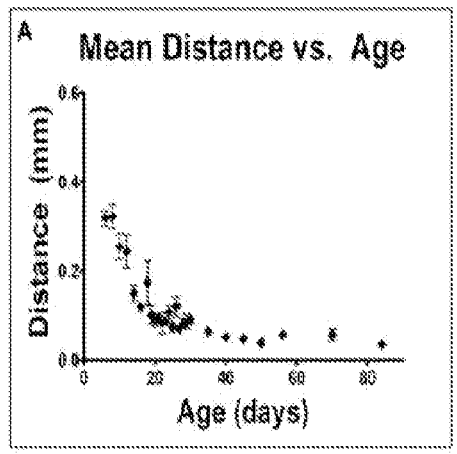
FIGS. 9a-9e are graphs showing the measurement of mean horizontal distance of the posterior front suture boundary of FIG. 3 in accordance with an embodiment of the present invention.
Figure 9D:
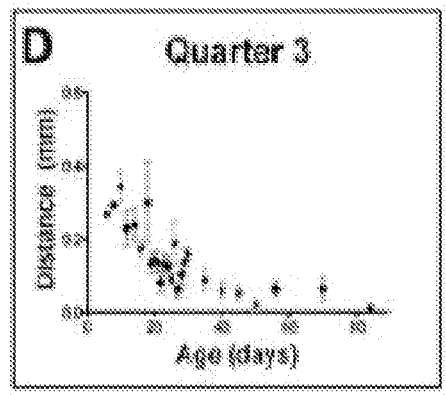
Figure 9B:
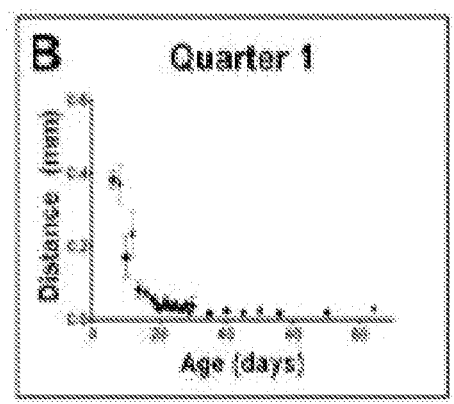
Figure 9E:
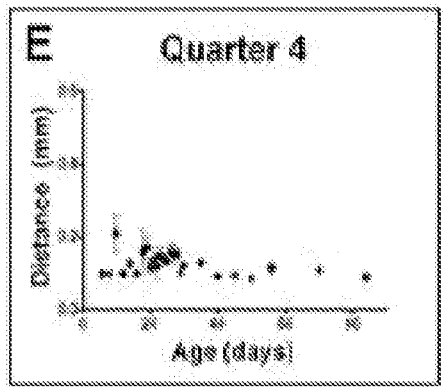
Figure 9C:
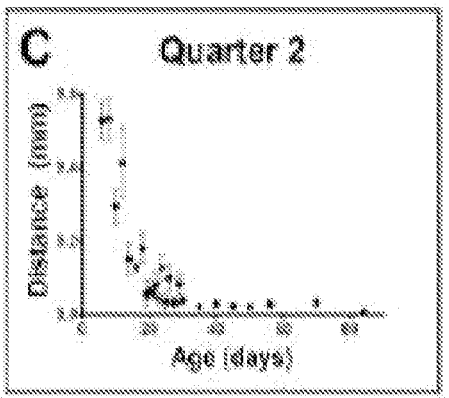

The mean horizontal distance of the posterior frontal suture remained relatively constant at 0.30 mm until day 10, decreased until day 20, and reached a plateau of approximately 0.05 mm, shown in FIG. 9a. The distance of the $1^{st}$ quarter was initially 0.40 mm and decreased dramatically until reaching a plateau by day 20, shown in FIG. 9b. Similarly to what was seen in percentage of suture open, the $2^{nd}$ and $3^{rd}$ quarters also had a later and more gradual decrease in distances as the region moved posterior, shown in FIGS. 9c and 9d. The posterior most $4^{th}$ quarter showed no changes throughout the age range and had a mean distance of approximately 0.10 mm, shown in FIG. 9e. The minimum distance, maximum distance, and suture area all showed identical trends and timing to what was seen with the mean distance.

Figure 10A:
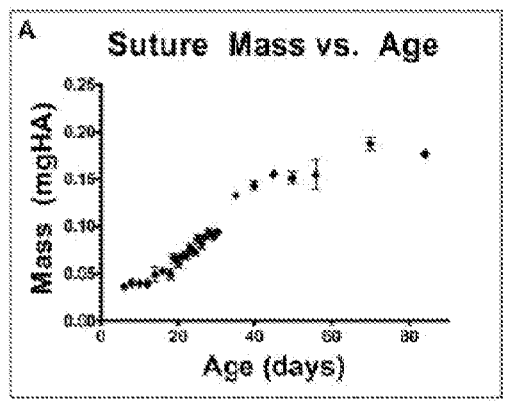
FIGS. 10a-10e are graphs showing the measurement of the bone mass of the entire posterior frontal suture boundary of FIG. 3 in accordance with an embodiment of the present invention.
Figure 10D:
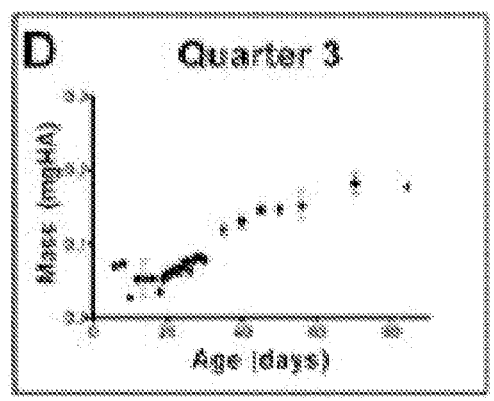
Figure 10B:
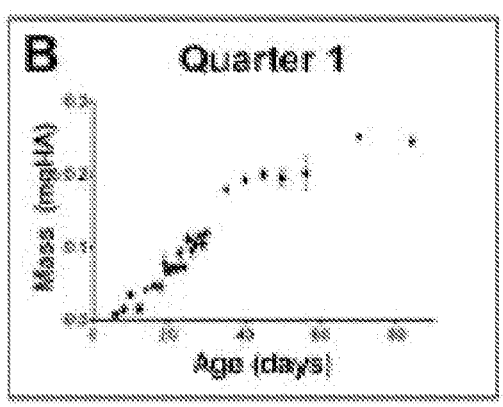
Figure 10E:
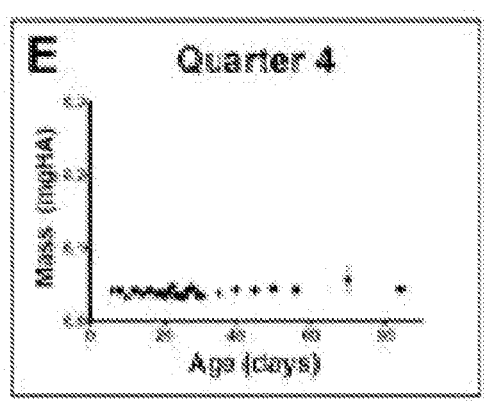
Figure 10C:
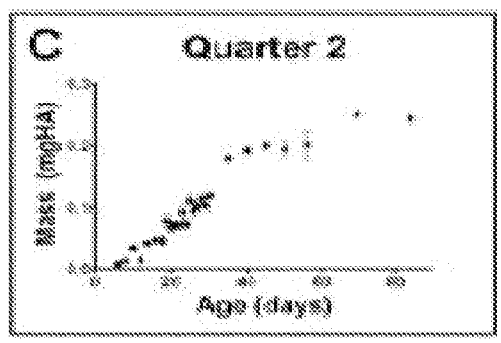
Figure 11A:
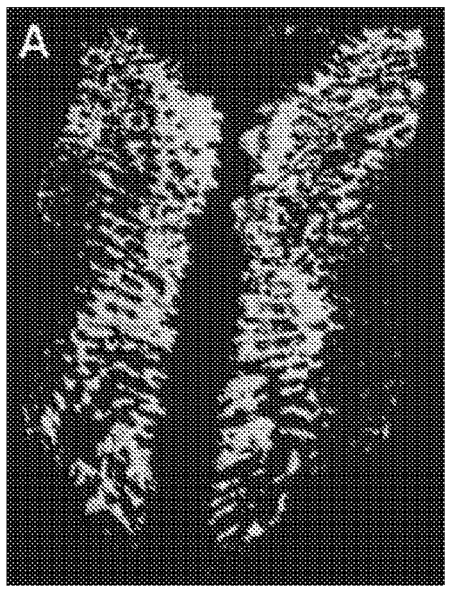
FIGS. 11a-11d are three dimensional reconstructions of the posterior frontal suture boundary of FIG. 3 in accordance with an embodiment of the present invention.
Figure 11B:
Figure 11C:
Figure 11D:
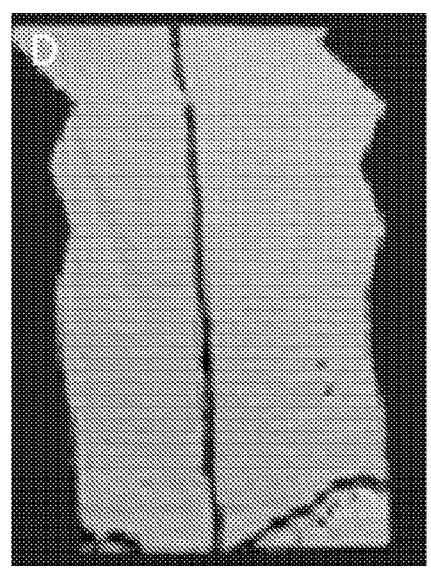

In contrast to the trends seen with the two prior measures, the bone mass of the entire posterior frontal suture remained relatively constant until day 20, then increased until reaching a plateau beginning on day 40, shown in FIG. 10a. The spatial analysis of the anterior three quarters showed that the bone mass increased later and more gradually moving from anterior to posterior, shown in FIGS. 10b-10d. The posterior most $4^{th}$ quarter showed no change in mass of the sutures throughout the entire age range, shown in FIG. 10e. The bone volume measurements showed identical trends and timing for the overall suture and for each of the 4 quarters.

FIGS. 11a-d are three-dimensional reconstructions of the posterior frontal suture support the results seen from the snake algorithm. At 6 days of age, the posterior frontal suture was mostly open and by 12 days of age the anterior region had begun to close in discontinuous segments, shown in FIGS. 11a and 11b. By day 20, the anterior most three quarters were mostly fused, but there were small segments that still remained open, shown in FIG. 11c. Between days 20 and 50 the most significant change seen was an increase in the thickness of the bone surrounding the sutures corresponding to the increase in mass and volume seen with the snake algorithm data, shown in FIG. 11d.

The algorithm developed is an extremely rapid, repeatable, and accurate method for the analysis of both the posterior frontal and coronal sutures. For the posterior frontal suture, the initialization phase of the algorithm correctly initialized the bones of the suture over 95% of the time. The errors that were encountered with this phase in the posterior frontal suture were most commonly caused by gaps in the skull outside of the suture. These gaps can be seen in the 3D reconstructions the suture. Especially in younger mice the suture mineralized discontinuously resulting in small islands of un-mineralized tissue. These errors were able to be easily corrected by manually defining the correct suture separation boundary and did not alter the final segmentation results.

The results from the algorithm clearly show that the posterior frontal suture fuses early in development. The percentage of the suture open, suture area, and all of the distance measurements began to decrease on day 12 and reach a plateau by day 20. This strongly suggests that the suture has completed fusion before three weeks of age. It is also important to note that the suture does not completely fuse. Even in the anterior regions of the oldest mice, there is not 100% suture closure nor do the distance measurements ever reach zero. The timing of the onset and plateau of this fusion is slightly later than the most recent report of the timing of PF suture fusion; however, there was never complete fusion of the suture.

Analysis of the spatial variations seen along the length of the suture showed that the anterior most quarters fused first and the most quickly, supporting previous work suggesting that posterior frontal suture fusion proceeds from anterior to posterior. Despite this overall trend, the posterior frontal suture fused in a very discontinuous process. For the earlier time points there were multiple "bridges" that formed and then expanded to fuse the suture. Unlike the remainder of the suture, the posterior most $4^{th}$ quarter of the suture did not show any substantial changes in fusion for any of the time points. This lack of suture fusion is most likely due to the close proximity to the normally open sutures near the bregma.

The 3D reconstructions of the coronal suture combined with the snake algorithm developed provide for improved assessment of the coronal suture fusion. This reconstruction corrects for potential distortions along the length of coronal suture. The initialization phase of the algorithm resulted in slightly more errors with the coronal suture as compared to the posterior frontal suture. This is most likely caused by the substantial overlap seen with the bones of the coronal suture. This overlap frequently resulted in very close vertical proximity between the two bones. This proximity, combined with the fibrous tissue in the suture, made the approximation phase especially difficult.

Although these errors were readily identified and corrected by the interactive tool, this did increase in the amount of time the user had to spend processing each scan. The results from the coronal suture data showed that, similar to the posterior frontal suture, the distance between the bones decreased beginning at day 12 and then reached a plateau by day 20. The bone mass of the coronal suture also increased, but this increase occurred one week sooner than what was seen with the posterior frontal suture. The biggest difference between the two sutures was seen with the percentage of suture open. Unlike the 80% decrease seen in the percentage of posterior frontal suture open, the coronal suture only had a 40% decrease. These results suggest that the bones of the coronal suture grow closer together, increase in mass, but do not fuse to the same extent compared to those of the posterior frontal suture.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses of the present invention, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing various embodiments of the present invention.

The program(s) can be implemented in assembly or machine language, if desired. In any case, the language can be a compiled or interpreted language, and combined with hardware implementations. The methods and apparatuses for implementing various embodiments of the present invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of various embodiments of the present invention. Additionally, any storage techniques used in connection with the present invention can invariably be a combination of hardware and software.

While the present disclosure has been described in connection with a plurality of exemplary embodiments, as illustrated in the various figures and discussed above, it is understood that other similar embodiments can be used or modifications and additions can be made to the described embodiments for performing similar functions of the present invention without deviating therefrom. Therefore, the present invention should not be limited to any single embodiment, but rather construed in breadth and scope in accordance with the following claims.

What is claimed is:

1. A computer implemented method of identifying boundaries between one or more components of a three dimensional medical image comprising a plurality of pixels, comprising:
    identifying images of one or more bones from a three dimensional medical image;
    estimating a preliminary boundary of the one or more bones by using a global threshold value on the medical image;
    storing the preliminary boundary on a computer readable storage medium;
    initializing a snake algorithm comprising an energy, wherein the snake algorithm is initialized by the preliminary boundary to optimize a final segmentation boundary of the medical image; and
    reconstructing a three dimensional image that is perpendicular to the preliminary boundary about all three axes by performing interpolation in all three dimensions using an orthogonal vector and a tangent vector calculated from a plurality of center points of the preliminary boundary.

2. The method of claim 1, wherein estimating the preliminary boundary of the one or more bones using the global threshold value further comprises determining a number of bones.

3. The method of claim 1, wherein estimating the preliminary boundary of the one or more bones using the global threshold value comprises classifying a pixel of the plurality of pixels as bone if the intensity of the pixel is above the global threshold value and classifying the pixel of the plurality of pixels as non-bone if the intensity of the pixel is below the global threshold value.

4. The method of claim 1, wherein the snake algorithm comprises an adaptive contour segmentation algorithm.

5. The method of claim 1, wherein initializing the snake algorithm comprises reducing the energy based on geometry and a relative edge intensity of the final segmentation boundary.

6. The method of claim 1, wherein the step of initializing a snake algorithm is repeated until the energy of the snake algorithm is constant.

7. The method of claim 1, wherein the step of initializing a snake algorithm is repeated for a predetermined number of iterations.

8. The method of claim 1, further comprising initializing a second snake algorithm, wherein the second snake algorithm is initialized by the optimized final segmentation boundary of the previous initialization of the snake algorithm.

9. The method of claim 1, further comprising:
identifying a horizontal, axial or radial midpoint between at least two bones of the one or more bones;
fitting a polynomial between the midpoint and the preliminary boundary of the one or more bones; and
producing at least one image for each of the at least two bones of the one or more bones.

10. The method of claim 1, wherein the center points of the preliminary boundary are identified by a user in axial or sagittal sections of the medical image.

11. The method of claim 1 wherein the orthogonal vector and the tangent vector are calculated by:
fitting a polynomial through the center points;
taking a derivative of the polynomial to determine a vector tangential to the preliminary boundary by calculating a partial derivative in all three dimensions;
determining the tangent vector tangent to the preliminary boundary;
determining a normal vector normal to a surface; and
determining the orthogonal vector by taking cross product between the tangent vector and the normal vector.

12. A non-transitory computer readable storage medium having instructions stored thereon for identifying boundaries between components of a three dimensional digital medical image, the instructions comprising instructions for:
receiving an input identifying the images of one or more bones from a three dimensional digital medical image;
estimating a preliminary boundary of the one or more bones by using a global threshold value on the digital medical image;
storing the preliminary boundary on a computer readable storage medium;
initializing a snake algorithm comprising an energy, wherein the snake algorithm is initialized by the preliminary boundary to optimize a final segmentation boundary of the digital medical image; and
reconstructing a three dimensional image that is perpendicular to the preliminary boundary about all three axes by performing interpolation in all three dimensions using an orthogonal vector and a tangent vector calculated from a plurality of center points of the preliminary boundary.

13. The non-transitory computer readable storage medium of claim 12, wherein the instructions for estimating the preliminary boundary of the one or more bones using the global threshold value comprise instructions for classifying a pixel of a plurality of pixels as bone if the intensity of the pixel is above the global threshold value and classifying the pixel of the plurality of pixels as non-bone if the intensity of the pixel is below the global threshold value.

14. The non-transitory computer readable storage medium of claim 12, wherein the snake algorithm comprises an adaptive contour segmentation algorithm.

15. An apparatus for identifying boundaries between components of a three dimensional digital medical image comprising a plurality of pixels, the apparatus comprising:
an input device for receiving an input identifying the images of one or more bones from a three dimensional medical image;
a processor for executing instructions stored on a computer readable storage medium, the instructions comprising instructions for:
estimating a preliminary boundary of the one or more bones by using a global threshold value on the medical image file;
initializing a snake algorithm initialized by the preliminary boundary of the bones to optimize the segmented bone boundaries of the medical image; and
reconstructing a three dimensional image that is perpendicular to the preliminary boundary about all three axes by performing interpolation in all three dimensions using an orthogonal vector and a tangent vector calculated from a plurality of center points of the preliminary boundary;
a memory for:
storing the medical image; and
storing the preliminary boundary.

16. The apparatus of claim 15, wherein the snake algorithm comprises an adaptive contour segmentation algorithm.

17. The apparatus of claim 15, wherein the apparatus is used for reconstructing and quantifying normal cranial and suture development, pathologic suture fusion, fractures of the skull, skull re-growth following surgical intervention, fracture healing, and non-union and delayed union fractures.

18. The non-transitory computer readable storage medium of claim 12, wherein the orthogonal vector and the tangent vector are calculated by:
fitting a polynomial through the center points;
taking a derivative of the polynomial to determine a vector tangential to the preliminary boundary by calculating a partial derivative in all three dimensions;
determining the tangent vector tangent to the preliminary boundary;
determining a normal vector normal to a surface; and
determining the orthogonal vector by taking cross product between the tangent vector and the normal vector.

19. The apparatus of claim 15, wherein the orthogonal vector and the tangent vector are calculated by:
fitting a polynomial through the center points;
taking a derivative of the polynomial to determine a vector tangential to the preliminary boundary by calculating a partial derivative in all three dimensions;
determining the tangent vector tangent to the preliminary boundary;
determining a normal vector normal to a surface; and
determining the orthogonal vector by taking cross product between the tangent vector and the normal vector.

* * * * *